US006751903B2

(12) United States Patent
Shryock (10) Patent No.: US 6,751,903 B2
(45) Date of Patent: Jun. 22, 2004

(54) MODULAR FLOATING DECORATIVE GARDEN AND RELATED WATER QUALITY PROCESS

(76) Inventor: Arnold Shryock, P.O. Box 1632, Kodiak, AK (US) 99615

( * ) Notice: Subject to any disclaimer, the term of this patent is extended or adjusted under 35 U.S.C. 154(b) by 0 days.

(21) Appl. No.: 10/223,803

(22) Filed: Aug. 19, 2002

(65) Prior Publication Data

US 2003/0049392 A1 Mar. 13, 2003

Related U.S. Application Data

(60) Provisional application No. 60/313,547, filed on Aug. 18, 2001.

(51) Int. Cl.[7] .............................. A01G 7/00; A01G 9/02
(52) U.S. Cl. .......................................... 47/59 R; 47/85
(58) Field of Search ......................... 47/63, 65.9, 66.5, 47/66.6, 85–87, 64, 59 R, 62 R, 65.5

(56) References Cited

U.S. PATENT DOCUMENTS

| 183,163 A | 10/1876 | Hegarty | |
|---|---|---|---|
| 2,175,113 A | 10/1939 | Fischer | |
| 2,283,472 A | 5/1942 | Tuxhorn | |
| 2,531,562 A | 11/1950 | Eve | |
| 3,018,586 A | 1/1962 | Farlay | |
| 3,822,499 A | 7/1974 | DeVos | |
| 3,927,491 A | 12/1975 | Farnsworth | |
| D248,289 S | 6/1978 | Opitz | |
| 4,133,141 A | 1/1979 | Lee | |
| 4,290,229 A | * 9/1981 | Miura | 47/65 |
| 4,355,484 A | 10/1982 | Mandish | |
| 4,382,348 A | 5/1983 | Kitsu et al. | |
| 4,487,588 A | 12/1984 | Lewis, III et al. | |
| 4,536,988 A | 8/1985 | Hogen | |
| 4,607,454 A | 8/1986 | Koike | |
| 4,888,912 A | 12/1989 | Murray | |
| 4,926,584 A | 5/1990 | Horibata | |
| 5,010,837 A | 4/1991 | Hirose | |
| 5,050,341 A | * 9/1991 | Breezer et al. | 47/59 R |
| 5,337,516 A | 8/1994 | Hondulas | |
| 5,528,856 A | * 6/1996 | Smith et al. | 47/59 R |
| 5,799,440 A | 9/1998 | Ishikawa et al. | |
| 5,836,108 A | 11/1998 | Scheuer | |
| 6,014,838 A | 1/2000 | Asher | |
| 6,025,042 A | 2/2000 | Kligman et al. | |
| 6,032,410 A | * 3/2000 | Kumar | 47/56 |
| 6,086,755 A | 7/2000 | Tepper | |

FOREIGN PATENT DOCUMENTS

| DE | 2905759 A | * 8/1980 | A01G/31/00 |
|---|---|---|---|
| JP | 402109915 A | * 4/1990 | A01G/31/00 |
| JP | 10165019 A | * 6/1998 | A01G/31/00 |
| JP | 10191817 A | * 7/1998 | A01G/31/00 |
| JP | 410211897 A | * 8/1998 | A01G/31/00 |
| JP | 2002000098 A | * 1/2002 | A01G/31/00 |
| JP | 2002119159 A | * 4/2002 | A01G/31/00 |

OTHER PUBLICATIONS

Arnold Lee Shryock "Some Effects of Terrestial Biota Upon Development and Stability of Aquatic Ecosystems" 1971, 67 pages—Ou file at Idaho State University Biology Department.

* cited by examiner

*Primary Examiner*—Son T. Nguyen
(74) *Attorney, Agent, or Firm*—Michael F. Hughes; Hughes Law Firm, PLLC (57) ABSTRACT

This allows for modular floating gardens that can be fabricated into forms chosen by the end user to be aesthetically pleasing even before planting has matured. Because composite floating gardens created from these modules can be large, their form can be pleasing from a distance. Because these are significant structures, they can be incorporated into a process to improve water quality.

33 Claims, 9 Drawing Sheets

FIG. 1

FIG. 2   POND

Structural module omitted on subsequent figures

MODULAR FLOATING DECORATIVE GARDEN AND RELATED WATER QUALITY PROCESS

CROSS-REFERENCE TO RELATED APPLICATIONS

This application claims benefit of provisional application No. 60/313,547, filed Aug. 18, 2001 titled "Floating Garden: in Itself Decorative".

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Casual reading suggests that floating gardens have long served a functional purpose in cultures around the world and that hydroponic gardens can be efficient and productive. That hydroponic gardens have also long been designed to be decorative—much like sculptures—is reflected in U.S. Pat. Nos. 183,163 (1876) and 3,018,586 (1962). A wide range of floating hydroponic devices have been developed: some specifically for hydroponic structures, some for removing nutrient or growing food from natural water-bodies, and some to add decoration and aesthetically pleasing or useful vegetation to ponds or pools. Some designs intended for ponds (to now include pools, lakes or similar "low energy" aquatic environments) have many attributes of buoys or rafts, but with vegetation. Other designs are for submerged gardens of aquatic plants. These true aquatic plant designs include U.S. Pat. No. 2,283,472 (1942) having rock and soil with aquatic plants on a submerged tray suspended from a partially submerged raft and also include U.S. Pat. No. 4,487,588 (1984) that provided for a reusable submerged raft—again with suspended tray—which would be practical for growing aquatic plants in pot trays. Suspended trays for holding submerged, potted, true aquatic plants would also be good in decorative floating surface structures.

Floating gardens designed to aesthetically accent ponds include designs to accept soil. Examples include U.S. Pat. No. Des. 248,289 (1978) for a rectangular floating garden box with soil and U.S. Pat. No. 5,836,108 (1998) which is similar but which has a specific design allowing for varying polyhedral shapes and for cedar sidewalls to allow slow water flow into or out of the soil inside the box (and a high drain holes in case of heavy rain). Another design, U.S. Pat. No. 4,355,484 (1982), has an inset screen supporting the soil and allows free access to the soil by the water. Other plant floating designs based on soil (or equivalent media) also have a secondary purpose of removing nutrient from the pond. Examples include U.S. Pat. No. 4,133,141 (1979) which allowed roots to grow through soil into the water while at the same time allowing roots to also obtain some nutrient from a nutrient tank. More recently in the design of U.S. Pat. No. 5,799,440 (1998), roots are also allowed to grow through the soil and into the water to remove nutrient, but a mechanism to release oxygen to the water is integral to the design. There are other patented floating structures with additional decorative or functional purpose. A German patent, DE 2905759C2 (1980), describes a floating trigon encompassing a bag of soil which can be planted (each trigon can be attached one to another to create simple geometric shapes). A Japanese patent, JP 10191817A (1997), describes floating media-filled garden boxes that move up and down on fixed piers—much like floating docks but with segments not attached one to another—to stabilize shorelines and provide bird habitat.

Designs for floating standard pots are also seen. U.S. Pat. No. 2,531,562 (1950) envisioned buoyant collars to support one or more plant pots. In U.S. Pat. No. 6,014,838 (2000), a screen is added to protect the collar from damage by aquatic animals. These are stand-alone assemblies that can float free or be anchored.

Commercial hydroponic designs are readily adaptable to uses on a pond. A floating wafer in U.S. Pat. No. 2,175,113 (1939) had gauze supported seeds germinating and growing on a floating wafer (with or without a thin colloidal soil layer). Floating hydroponic rafts have two main mechanisms to allow roots to grow into water: a screen (or perforated plate) that is suspended between buoyant members or a buoyant perforated pad. U.S. Pat. No. 4,382,348 (1983) describes a porous plate with buoyant frame, while U.S. Pat. No. 3,927,491 (1975) describes a buoyant porous pad that can be inset into a larger buoyant pad as the plant grows. U.S. Pat. No. 4,607,454 (1986) describes a buoyant hydroponic device where a specifically designed porous plate-like pad has some buoyancy but is augmented by a buoyant frame. U.S. Pat. No. 5,010,837 (1991) has a buoyant pad for hydroponic purposes spanning a marine device. These tend to be good improvements on a basic theme, while U.S. Pat. No. 6,086,755 (2000) sandwiches several components into a unique design (most like a buoyant pad). At least one soil-less hydroponic design, U.S. Pat. No. 4,926,584 (1990), is designed to function as a stand-alone attractive floating ornament.

The basis of almost all wastewater treatment involves using organisms. Some wastewater treatment processes are extremely good at removing nutrients. A number of patents use macrophytic aquatic organisms to remove nutrients in waters passed through a device. An example is U.S. Pat. No. 5,337,516 (1994) which circulates waste water through a controlled basin of aquatic plants in floating containers (with a soil component). Directly removing nutrients from ponds and making use of aquatic plants such as duckweed are seen in a number of designs. A large complex tank (with an inflow and outflow) having both large rooted plants on the bottom and buoyant impoundments with floating rootless plants is described by U.S. Pat. No. 5,528,856 (1996). U.S. Pat. No. 4,536,988 (1984) describes a grid system that through controlling horizontal movement—spreads free-floating aquatic plants out over the surface and facilitates their harvest. U.S. Pat. No. 4,888,912 (1989) contains aquatic plants in envelopes suspended from floats.

Studying terrestrial vegetation flooded yearly at the Palisades Reservoir in Wyoming, I was not only impressed by the improvement in aesthetics from these terrestrial plants juxtaposed into an aquatic environment, I came to believe that their structural contribution to their new aquatic environment might equal their biotic and chemical contribution. Plant devices with maximum vertical and horizontal encroachment into a pond seem most likely to make a significant contribution to the aquatic environment in which they are placed. Horizontally significant devices—including floating gardens—are more likely to be impressive at any distance from the pond, but they are also very difficult to physically handle. Assembling floating garden modules into larger shapes is more practical if any object of large scale is envisioned. Fortunately, because of the similarity of floating hydroponic designs to buoys and rafts, there are many conventional connectors available. Although snaps and ties may be the most practical way to join modules, using pegs as seen in U.S. Pat. No. 3,822,499 (1972) might provide a connection with fewer possibilities for entanglement (important because there will always be neglectful parents and children not prepared for water hazards they are allowed to encounter). Pegs and the receiving locations on the modules would need to modified to allow for clips or retention pins.

Modules would not only allow for greater scale, but allow gardens to be shaped to appear—at a distance—like some attractive pond feature as a water lily. This would be much different than the normal scale passable replica of a water lily as seen in U.S. Pat. No. 6,025,042 (2000).

BRIEF SUMMARY OF THE INVENTION

There are multiple objects to this invention: create large floating gardens that can be aesthetically pleasing on a pond or similar water-body even before plants have matured; allow end users the freedom to create their own individual designs using their personal choices of size, color, shape, and planting; and provide a device with potential to significantly improve, within the water-bodies on which these are located, those qualities that can be valuable to people. To do this, two major types of modules are created. Floating structural modules provide a framework to create shapes and help position the finished gardens. Garden modules can have different shapes, etc. and will have different functional designs to allow for different planting desires and differing potential for interacting with the water-body. Generally, garden modules will attach to structural modules to create the overall shape. Garden modules will have a size that allows for planting prior to attachment so that handling is manageable. The end user can attach structural modules to structural modules and garden modules to structural modules to make larger and more intricate shapes of their own creation. The finished designs can float free, be attached to shore, be tethered to an anchored "longline" running along the bottom, or anchored by other conventional means in place.

BRIEF DESCRIPTION OF THE SEVERAL VIEWS OF THE DRAWING

FIG. 1: This is a perspective of a representative composite floating garden with one structural module 1 to which are attached five garden modules 2. A buoy module 3—which can have any shape appropriate to the overall display (in this instance a flower bud shape might be appropriate)—is attached to a retrieval line from a conventional anchoring system. The anchoring system chosen depends on the water-body. Only a small anchor 4 that could actually be drug along the bottom by pulling on the floating garden might be satisfactory on a shallow sheltered pond, while a heavier anchor attached to chain or sinking line weighted right where it attaches to the line rising to the garden may be needed for a deeper water-body with occasional light wave action or gentle current. In this instance, a retrieval line allows the anchor to be recovered first and then the garden can be moved to shore.

FIG. 3: This shows a structural module fitted to take a tie or snap connection to another module. In this example, there is a central hole 10 to which connection to the buoy module can be made (by many conventional means). Line radiating from the center 9 or traversing the perimeter can provide strong support for connectors. In this example, the snap or tie point 11 is inset.

FIG. 8: This illustrates a garden module molded as one piece 20 and designed to take soil or its equivalent. It would have amply large holes in the base to allow roots to grow into the water (for those plants that would) and would have a root penetrable membrane covering these holes.

FIG. 10: This is a partial view of a buoyant garden module pad 21 with rectangular slot openings 25 in the pad. These openings will normally be two to six inches wide and one to two inches thick. These openings are designed to take a rectangular insert. The openings may proceed uninterrupted through the pad or there may be a ledge near the bottom to stop the insert. The insert 26 can be two or more thicknesses of reclaimed home carpet which is inserted with the pile sides toward the center to form a "sandwich" to snug a transplant or seed into the garden module. In this illustration, the insert is secured by pins through the carpet.

FIG. 11: This exploded cross-sectional view of opening 25 shows a ledge in this opening and high-pile inserts 27 fabricated to fit the opening. These inserts will be folded to have a pocket to hold slow-release fertilizer. These inserts can be fabricated of any decay resisting fiber that—though wound into loops or spirals to gently resist compression—will spring back against a seed or transplant to hold it in position on the garden module. Channels within the weave of this fabric would ideally allow both vertical and lateral movement of the roots and stem along the face of the inserts. Capillary action will bring water from the pond into the insert.

FIG. 16: In this cross section of the buoyant framework of a garden module 33, clear plastic 36 rises up. In this illustration it curves inward to create an open semi-dome in full aspect. This plastic will be either inset or molded into buoyant framework and can be curved or straight. Its primary purpose is to keep jumping fish such as salmon or trout from stranding themselves inside garden modules with a cavity. Curved and truncated dome shapes may be more attractive and will have some benefit in retaining heat and moisture in the air near the plants. A perforated plastic lid could be attached to this dome to create miniature floating greenhouse modules.

FIG. 17: In this cross section, the buoyant member 37 will have little or no structural purpose. Structural needs will be met by a formed metal or plastic insert 38 which wraps up and over the buoyant framework. This insert would undoubtably be perforated and can be formed to have an integral stability curtain (and riser as seen in FIG. 16.). Resting on this insert may be any form 39 of membrane, buoyant pad, spacer, etc. previously described for garden modules. This configuration would have several advantages. A wider range of buoyant supports would be practical (to include molded close-cell foam, hollow metal, shaped PVC floats, or even glass). The insert can more easily be finished with fade-resistant colors and can be shaped to easily stack. As exploded view FIG. 18 illustrates, the buoyant member 40 can also be designed to be stacked. Either the insert or the buoyant member can be fitted with standard connectors.

FIG. 19: In this garden module cross section, a perforated insert 41 rests on a buoyant member 37. Although not fully enclosed, floating aquatic plants will effectively be contained both vertically and horizontally. This may be practical both aesthetically and functionally in some locations.

Drawings and these descriptions are intended to be illustrative, not limiting.

DETAILED DESCRIPTION OF THE INVENTION

Figure 1:
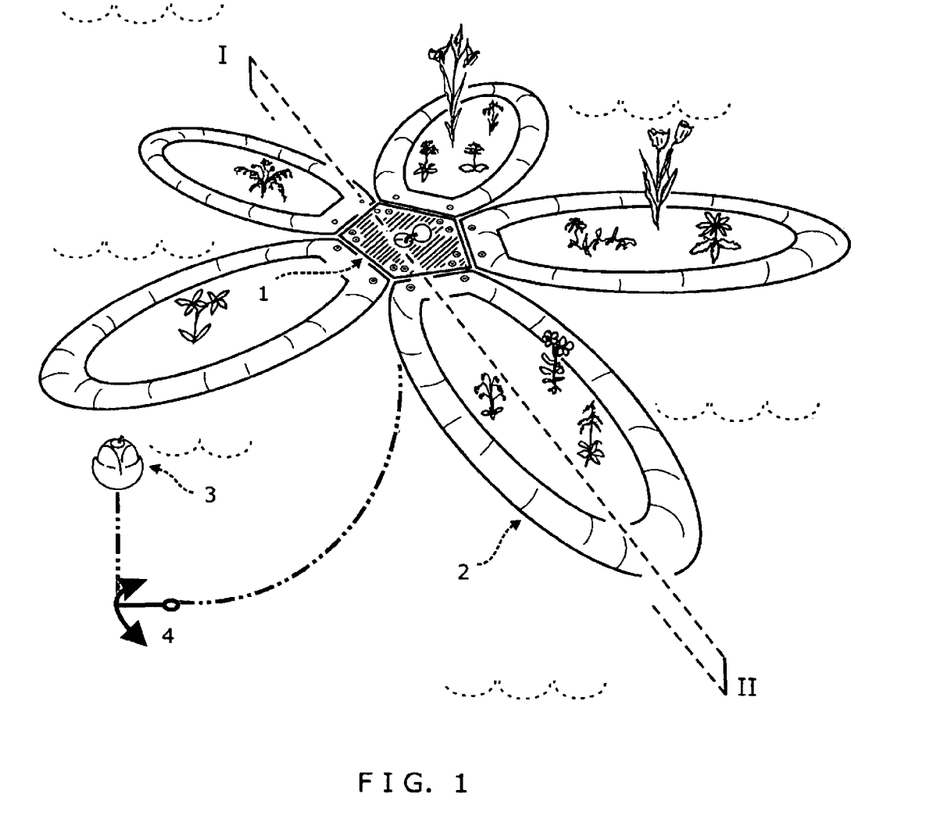
Figure 2:
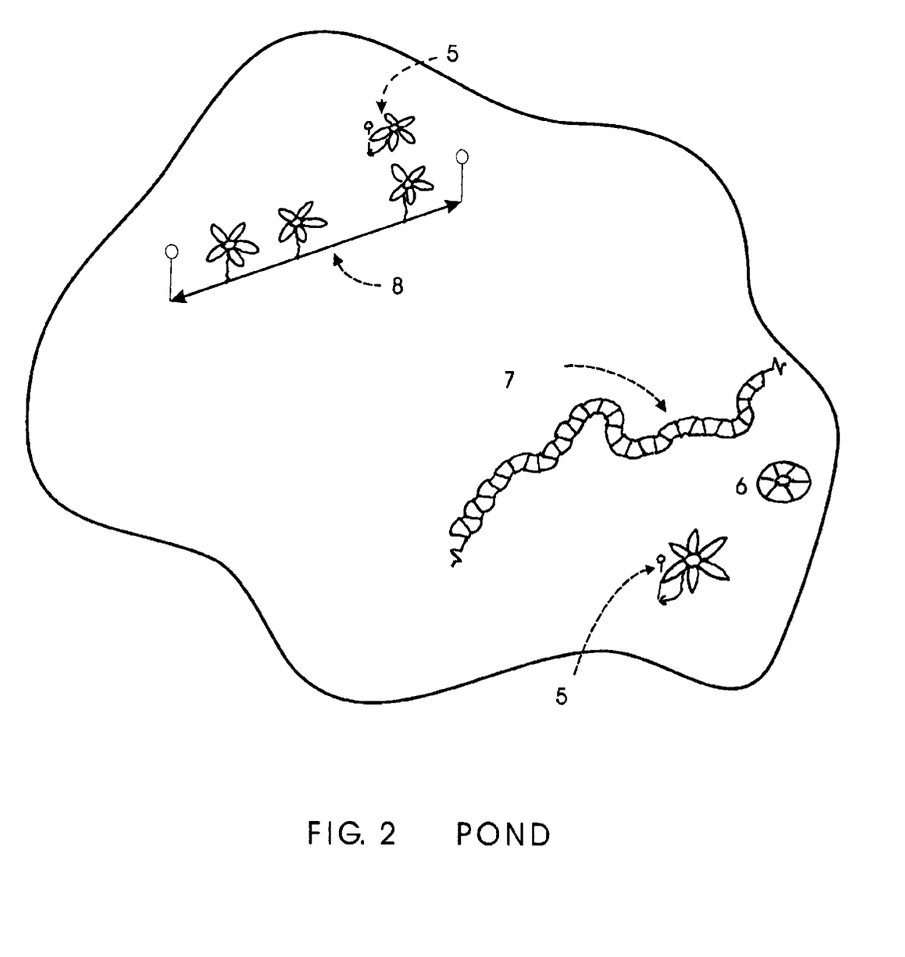
FIG. 2: This pond Illustration shows two flower shaped floating gardens 5 (one conventionally anchored and one free floating), three flower shaped floating gardens 8 tethered to an anchored line running along the bottom (with buoy modules rising to the surface), and one lily leaf shaped floating garden 6 that is free floating and restricted to one end of the pond by a string of structural and garden modules 7 which are attached one to another and secured to the shore.
Figure 3:
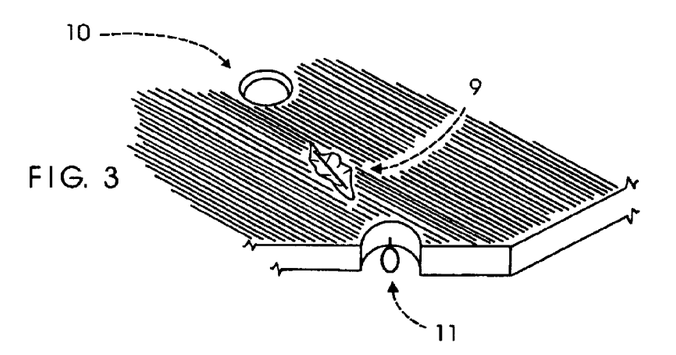
Figures 4, 5:
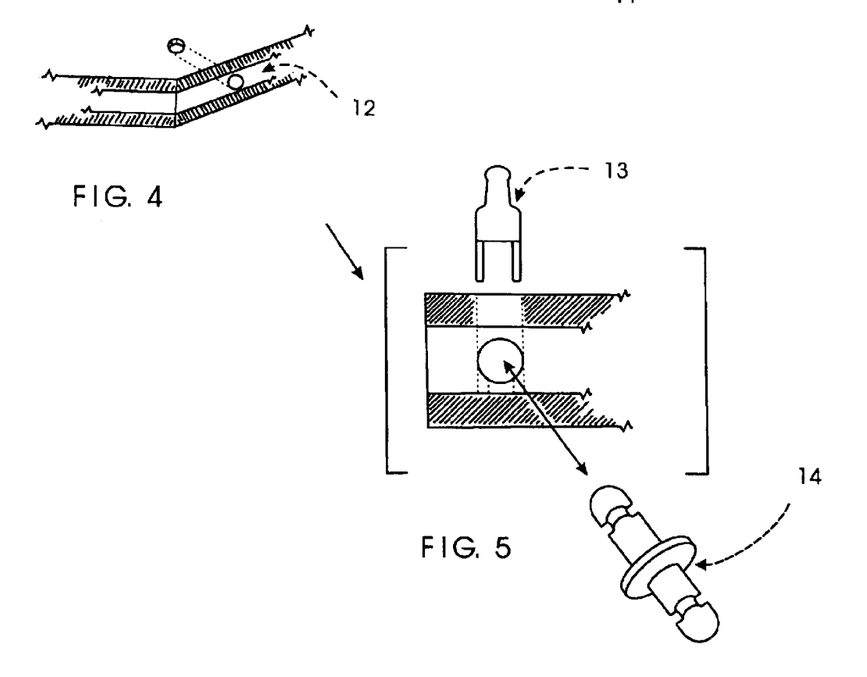
FIG. 4: This shows a module—either structural or garden—designed to take peg 14 (with a retainer clip or pin). The insertion points 12 would be along the perimeter of these modules. These modules might have multiple layers of buoyant material such as closed cell foam and any suitable stronger material.
FIG. 5: This is an expanded sectional view of the module and perspective view of a peg 14 (two module styles: one attaches to an identical fitting and one takes a snap or tie). A retainer clip designed for friction fit in the upper layer 13 is illustrated. If a retainer pin were to be used, the peg would probably not be cylindrical.
Figure 6:
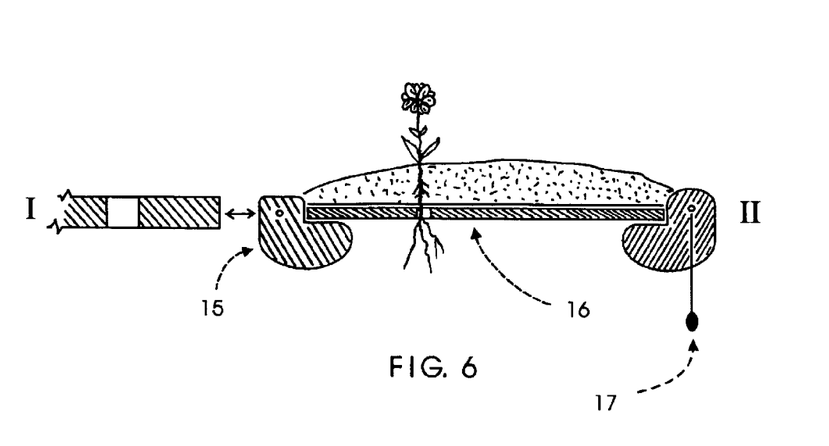
FIG. 6: This sectional view shows representative cross-section of a garden module with closed cell buoyant framework support 15 having a ledge to support a rigid coarsely perforated spacer 16. A line incorporated into the buoyant support 15 is also used to support connections to other modules or connections to the internal spacer. If used, spacers can be of different thicknesses—depending on the desires of the end user—and fitted with a root penetrable membrane on the upper side. These modules would be filled with soil or some equivalent. A weighted pendent 17 is shown attached to line in the buoyant support. This is to help stabilize these modules in moderate winds.
Figure 7:
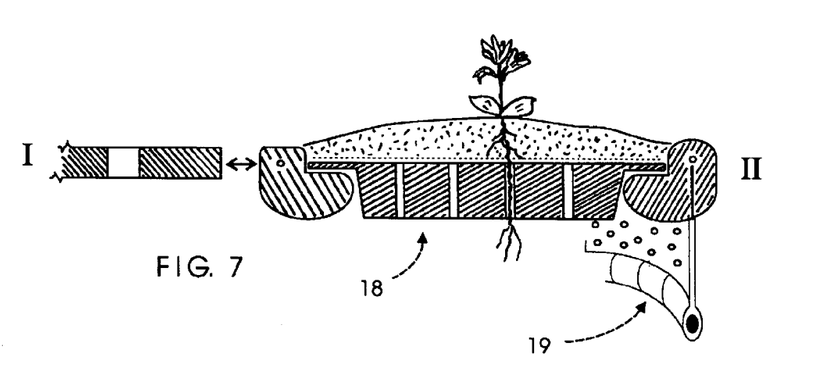
FIG. 7: This sectional view shows a buoyant pad 18 inset into the buoyant framework. A weighted perforated curtain 19 is attached to the line incorporated into the buoyant framework (and probably molded into that framework) to provide for module stability in winds. This would be a preferred means of providing such stability.
Figure 8:
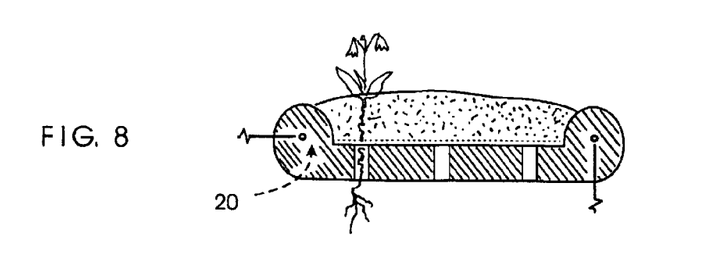
Figure 9:
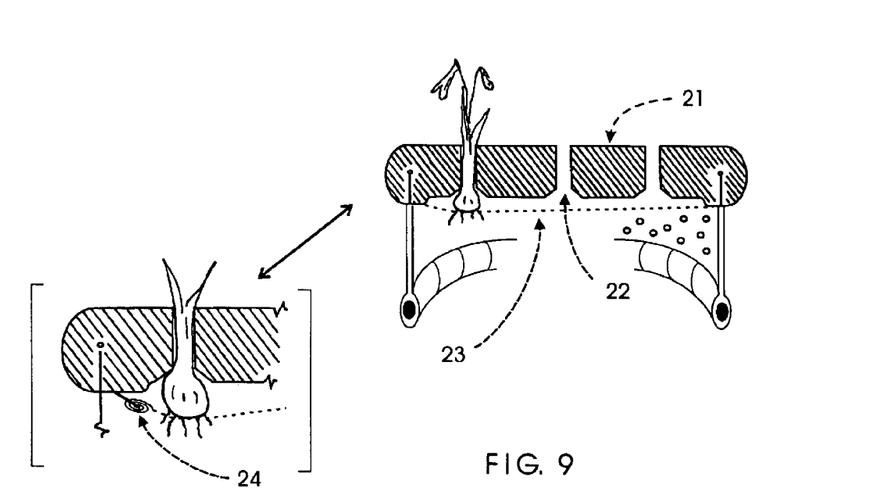
FIG. 9: This illustrates a garden module 21 not designed to support soil molded in one piece and does not have a recognizable buoyant ridge around the outside perimeter. This example allows for hydrophytic plants to grow from underneath the module up through holes in it. In this representation, a conical hole 22 (from the underside) allows a bulb to be held in place by root penetrable mesh fabric 23. This mesh would be given some tension against the bulbs by elastic or by weak springs 24 attaching to the module near the perimeter.
Figure 10:
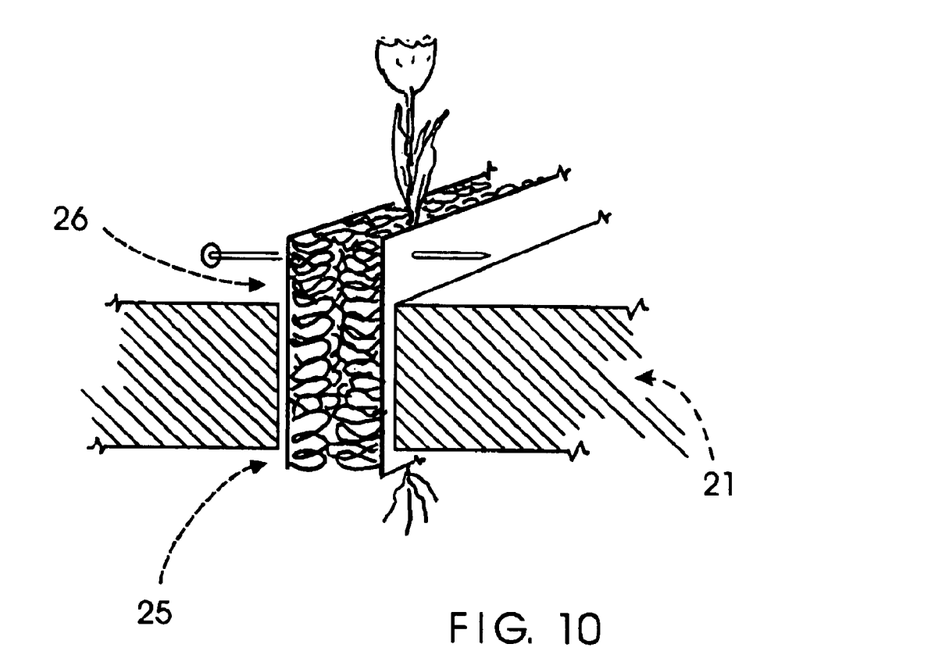
Figure 11:
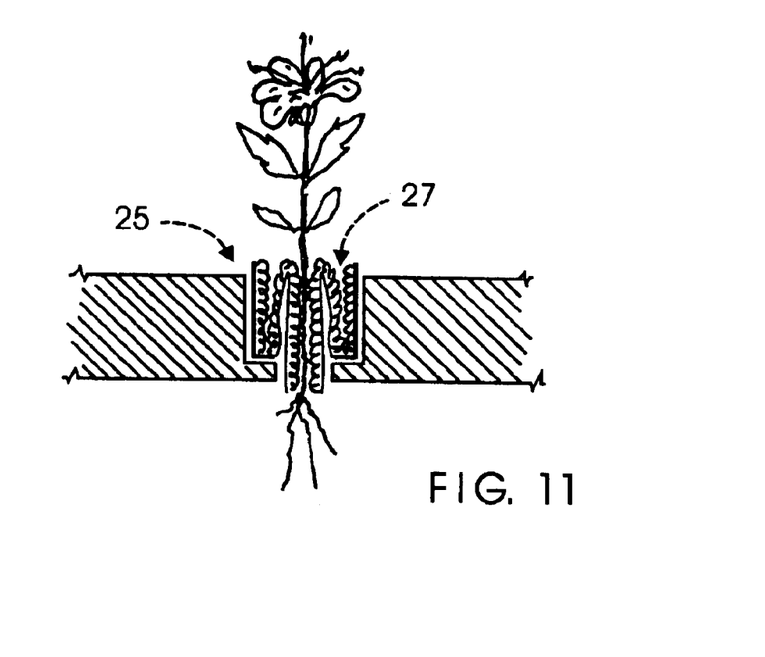
Figure 12:
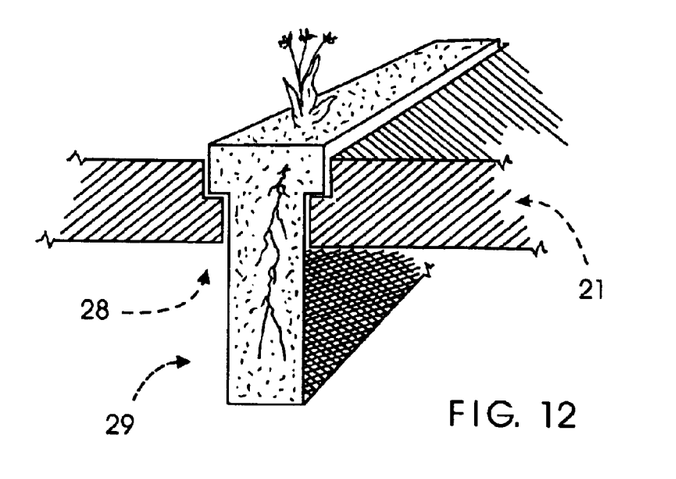
FIG. 12: This exploded sectional of a garden module pad 21 shows a rectangular slot opening 28 to hold a rigid perforated insert 29 designed to hold soil or its equivalent. This insert can be any durable rigid material suitable that is reasonably inert in water or it can be a durable inert fabric bag shaped to fit in the insert opening and having a rigid collar to support it on the garden module. This insert will extend well into the water-body and it is not material whether the roots are contained inside the insert or not. This insert can be any shape but is shown as a narrow rectangular book shape because of its greater chemical and structural interaction with the water-body versus, say, a squat cylindrical shape.
Figure 13:
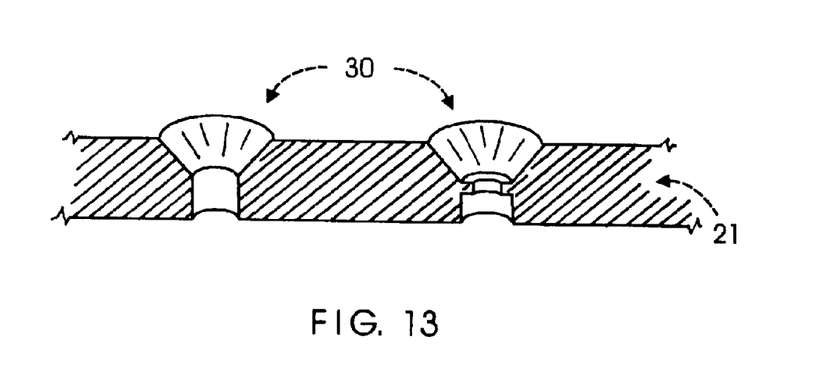
FIG. 13: This exploded sectional of a garden module pad 21 shows conical openings 30 designed to take a plug. The two shapes illustrated are both fabrications possible in a production version of this type of garden module.
Figure 14:
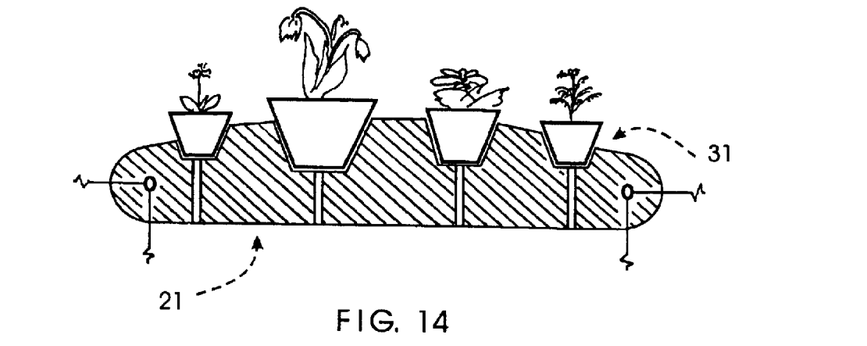
FIG. 14: This illustration shows a cross-section of a garden module 21 with indents 31 designed to take standard pots. Neither indents with drains or indents allowing the pot to directly contact the water-body would be novel; novelty would be in its modular nature.
Figure 15:
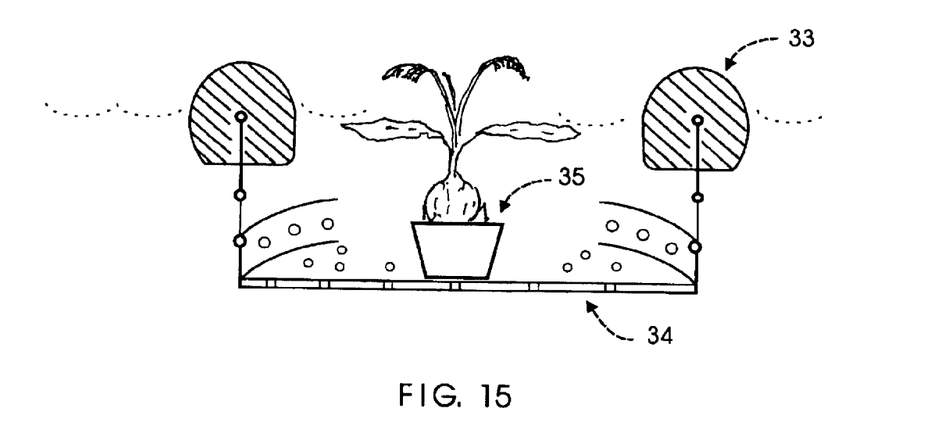
FIG. 15: In this cross section of the buoyant framework of a garden module 33, a light low-corrosive perforated metal (or similar inert sinking material) tray 34 is suspended. This tray will be designed to hold potted true aquatic plants 35 such as water lilies. Stability in the water will be provided by the tray and a pendant or curtain will not be needed.
Figures 16, 17, 18, 19:
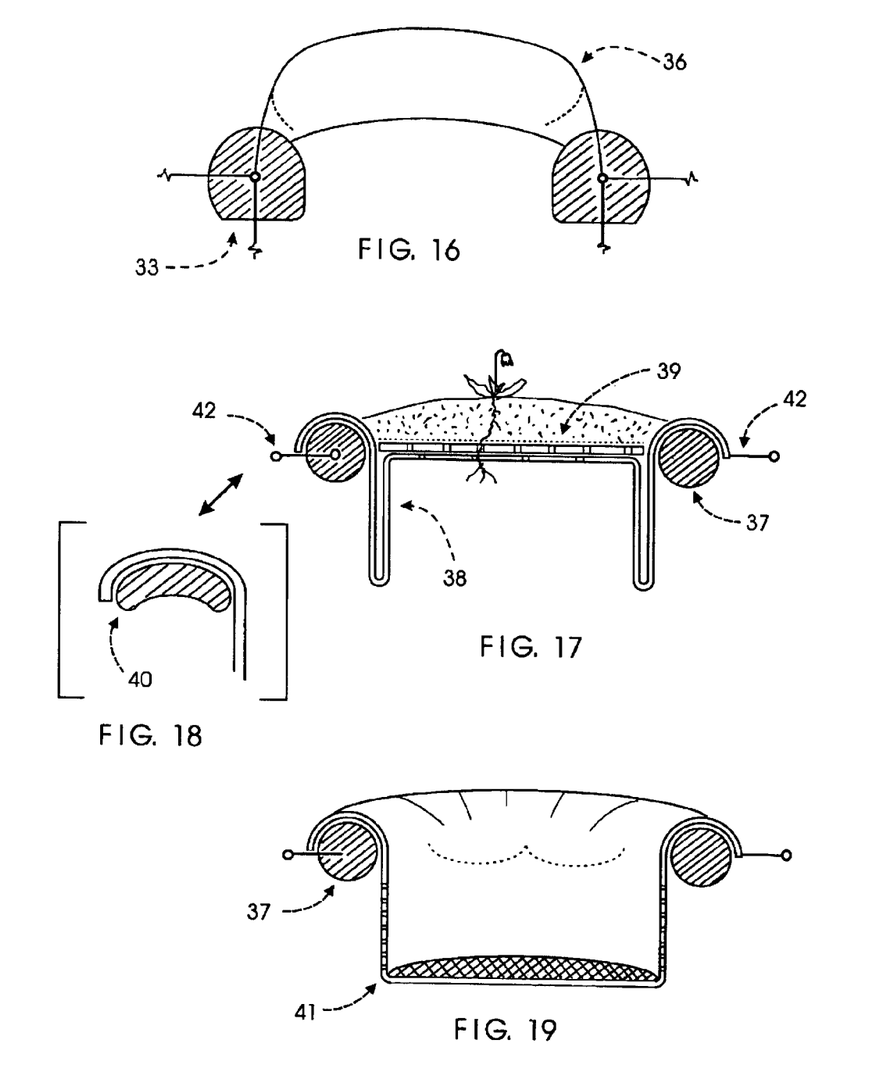

This invention consists of modules that can be connected together to form a composite floating garden that has aesthetically pleasing form to the end user even before plantings mature. There are 3 module types envisioned to form composite floating gardens: structural modules, garden modules, and buoy modules. It is an essential part of this invention that the end user have the freedom to combine modules to create any feasible design through the connection of supplied modules that is attractive or practical to that end user. Because the resulting composite structure can be large and, alone or in combination with other composite gardens, can conceivably cover a significant portion of the water-body on which it sits, it may also have significant desirable effect on water quality or on aquatic biota not directly associated with the floating gardens.

Structural modules will be thin sheets of any shape (probably one to 4 inches thick) having some flotation—preferably supplied by closed-cell foam—but the flotation will not be great. Instead, flexibility, ruggedness and strength of connections will be emphasized. Flexibility and strength of connection can be enhanced by organic or metal line molded into the module (in this case, ruggedness would primarily be determined by choice of close-celled foam), enhanced by any acceptable durable substance (organic or metal fabric or sheets) embedded between buoyant layers, or enhanced by external organic or metal reinforcement near attachment points (if this material possesses sufficient flexibility, it can even surround the perimeter of the structural module. Because these structural modules will generally be connected to multiple garden modules and because the garden modules will have different net buoyancies as plants develop (or different from the start because different styles of garden module are attached to one structural module) and because each garden module may be independently acted on by waves, etc., flexibility will be important to avoid great disturbance of one garden module to another through the structural module (if necessary for a particular aquatic environment, the structural module can be spoke shaped rather than sheet shaped to enhance flexibility—possibly with a rugged fabric covering the spokes much like the membrane at the base of an octopus' tentacles). There are a wide range of conventional connectors suitable for attachment but best connection may be achieved through a connector fabricated specifically for attaching these modules. Envisioned is a metal cylindrical peg with two circumferential groves machined into it to allow for a retainer clip. The clip would have two cylindrical studs threaded or embedded into it and these studs would fit into the peg's grooves and secure it to both the structural module or the garden module through shafts to accept the studs. Rather than a cylinder, a bar shaped peg could be used with a hole drilled through it to line up with holes for a retainer pin in the module. A combination peg-retainer and snap or tie connector may also be practical.

Garden modules will have any practical shape or color. They will all have necessary buoyancy to float any soil or plants on the module without assistance from any other module. Buoyancy can be achieved through any of a wide range of conventional materials and these devices can be given a durable finish—when necessary—either through choice of buoyant material or through conventional means such as electroplating, gel-coat, or epoxy paints. Just as there will be differing color or shape, there will be choices in modules that are functionally different. Although several of these devices are unique in themselves or have unique adaptations, many employ conventional design and, here, uniqueness will generally result from the modular construction and attachment to a structural module. Through conventional designs employing either molded one piece buoyant pads or buoyant frames with inserts, garden modules will be designed to support plants growing in soil with roots only in the soil, plants growing in soil with roots extending into the water, plants growing in conventional pots (either draining to the water-body or in contact with the water-body), hydrophytic or aquatic plants growing up through a buoyant pad and supported by a porous membrane or mesh, plants growing on a hydrophilic pad sitting atop a rigid porous support or spacer pad, and submerged trued aquatic plants growing in pots on an aquatically inert perforated metal or plastic tray. Unique features will include: 1) weighted perforated curtains to provide stability on ponds with moderate wind and some wave action; 2) a transparent plastic riser to prevent fish from jumping into the gardens and minimizing wave effects (with a conventional greenhouse dome possible as an accessory attachment); 3) for buoyant pads, a below-the-flotation indent (a truncated cone with its base at the bottom of the pad) for holding suitable hydrophilic or aquatic bulbs (held in place up against the pad indent by an elastic mesh); 4) a means for holding seeds or transplants in place (and add slow release fertilizer) on the floating garden modules using reclaimed home carpeting or using a specially fabricated loft fabric material to wick water up from the water-body and sandwich the plant between 2 high pile layers that press enough against the plant to hold it in place particularly when roots fill irregularities in the surface between two fabric layers enough to add stability—while having gentle enough pressure to allow roots and stem to adventure along the face rather than through the media; 5) a water surface device with a deep narrow perforated metal or plastic insert (or shaped rugged and aquatically inert fabric bag with a rigid collar) for holding soil or a soil equivalent suspended well into the water column (to increase deep interactive surface area and also allow hydrophytic plant roots to remove nutrient exchanged from the water column to the soil rather than only what they would take up directly from the water); 6) an metal or rugged formed/molded plastic insert that sits upon and partly encloses a buoyant member of any suitable conventional buoyant material (the insert acts as an exoskeleton and gives shape to the garden module, secures the buoyant member in place through its weight upon that frame, provides for stability in the water-body, and provides that base for any planting method already described (possibly having a concave depression to support a pile material to press upward against a bulb if a buoyant pad with bulb indent partly rests upon the insert); 7) a soil or soil-equivalent used where soil is inserted into the water column as described above (or where plants grow in soil with roots allowed to enter the water-body) can be enriched in selective nutrients that allow supported plants some level of robust growth while actively competing for the limiting nutrient in the water column.

An important aspect to this invention is the composite effect from placing these floating gardens on a water-body. Because they can cover a large surface area, they can effectively compete for sunlight with algae (that can quickly becomes so numerous that their respiration needs outstrip their oxygen output and they die and cause aesthetically unpleasing effects). Because differences in water transpiration, absorbed sunlight, and evaporation between the water-body and the garden can create surface water temperature differences, convection currents can result which will also result in changing biotic and chemical conditions. The gardens can pull nutrients directly from water-body and this may be enhanced where soil columns from the gardens extend into the water column. This may be further enhanced if fertilizers are applied to the soil or through slow release in the pads described above to support plants. Because of irregularity in the bottom of these gardens, the structural complexity of the aquatic environment is increased. The greater the protrusion into the water column, the greater the complexity. This results in many new micro-environments. Obvious will be attachment locations for periphyton and hiding places for small aquatic creatures. But just adding to the complexity may also change such things as how a predator seeks prey (hidden or not), etc. Many of the changes made are likely yield results agreeable to most people.

I claim:

1. A floating support assembly adapted to be positioned in a body of water, the floating support assembly comprising:
   a structural module having a perimeter region comprising a plurality of attachment points,
   a plurality of garden modules adapted to support plant organisms, the garden modules having a base region were each base region is adapted to connect to an attachment point of the structural module, the plurality of garden modules each having a rigid insert that is adapted to be supported an a floating buoyant support, the rigid insert having integral stability curtain adapted to be submerged into the body of water to provide stability and support,
   whereas the plurality of garden modules are adapted to independently reposition on said body of water with respect to an adjacent garden module and the garden modules are not directly connected to other garden modules to impede independent repositioning of each garden module wherefore disturbances in the body of water independently effect each garden module.

2. The floating support assembly as recited in claim 1 where the garden modules only have a positional connection to the structural module.

3. The floating support assembly as recited in claim 1 where the rigid inserts of the garden modules have central cavity region adapted to support plant life.

4. The floating support assembly as recited in claim 3 where the garden modules have different net buoyancies.

5. The floating support assembly as recited in claim 3 where structural module and plurality of garden modules have spoke shaped orientation.

6. The floating support assembly as recited in claim 3 where the floating support assembly is an ornamental design.

7. The floating support assembly as recited in claim 6 where the ornamental design is a flower-like arrangement.

8. The floating support assembly as recited in claim 1 where the garden modules have different net buoyancies.

9. The floating support assembly as recited in claim 1 where structural module and plurality of garden modules have spoke shaped orientation.

10. The floating support assembly as recited in claim 1 where a retrieval line is attached to the floating support assembly.

11. The floating support assembly as recited in claim 1 wherein the garden modules are adapted to accept closely spaced pile fabric as media where plant-life is supported and grows at the interface of the media instead of through the media.

12. The floating support assembly as recited in claim 1 wherein the garden modules are adapted to accept a plurality of closely spaced narrow inserts into the water column with a large ratio of surface area to volume thereby increasing removal of excess nutrient from the water column to plant roots and plant growth media.

13. The floating support assembly as recited in claim 1 where the floating support assembly is an ornamental design.

14. The floating support assembly as recited in claim 13 where the ornamental design is a flower-like arrangement.

15. The floating support assembly as recited in claim 1 wherein the garden modules have a semi-dome or vertical clear plastic plate attached to the perimeter of the garden modules.

16. A floating support assembly adapted to be positioned in a body of water, the floating support assembly comprising:
   a structural module having a perimeter region comprising a first attachment point and a second attachment point,
   a first garden module adapted to support plant organisms, the first garden module having a base region adapted to connect to the first attachment point of the structural module,
   a second garden module adapted to support plant organisms, the second garden module having a base region adapted to connect to the second attachment point of the structural module,
   whereas the first and second garden modules are connected to the structural module to impede relative horizontal movement between the first and second garden module on the body of water where the first and second garden modules are adapted to independently vertically reposition on said body of water and the first and second garden modules each have a rigid insert that is adapted to be supported on floating buoyant support, the rigid insert having integral stability curtain adapted to be submerged into the body of water to provide stability and support.

17. The floating support assembly as recited in claim 16 where the rigid inserts of the first and second garden modules each have a central cavity region adapted to house plant life.

18. The floating support assembly as recited in claim 17 where the first and second garden modules have different net buoyancies.

19. The floating support assembly as recited in claim 17 where structural module and first and second garden modules have spoke shaped orientation.

20. A floating support assembly as recited in claim 16 where a retrieval line is attached to the floating support assembly.

21. The floating support assembly as recited in claim 16 where the floating support assembly is an ornamental design.

22. The floating support assembly as recited in claim 21 where the ornamental design is a flower-like arrangement.

23. The floating support assembly as recited in claim 16 wherein the garden modules have a semi-dome or vertical clear plastic plate attached to the perimeter of the garden modules.

24. A floating support assembly adapted to be positioned in a body of water, the floating support assembly comprising:
   a structural module having a perimeter region comprising a plurality of attachment points,
   a plurality of garden modules adapted to support plant organisms, the garden modules comprising:
      a base region were each base region is adapted to connect to an attachment point of the structural module,
      a floating buoyant support,
      rigid insert that is adapted to be supported an said floating buoyant support, the rigid insert having integral stability curtain adapted to be submerged into the body of water to provide stability and support,
   whereas the plurality of garden modules are adapted to independently reposition on said body of water with respect to an adjacent garden module and the garden modules are not directly connected to other garden modules to impede independent repositioning of each garden module wherefore disturbances in the body of water independently effect each garden module.

25. The floating support assembly as recited in claim 24 where the garden modules only have a positional connection to the structural module.

26. The floating support assembly as recited in claim 24 where the rigid insert that is adapted to be supported on the floating buoyant support has a central region adapted to support plant life.

27. The flouting support assembly as recited in claim 26 where the floating buoyant support is a non-rigid material.

28. The floating support assembly as recited in claim 26 where the garden modules have different net buoyancies.

29. The floating support assembly as recited in claim 26 where structural module and plurality of garden modules have spoke shaped orientation.

30. The floating support assembly as recited in claim 24 where the floating buoyant support is a non-rigid material.

31. The floating support assembly as recited in claim 30 where the rigid insert provides structural shaped to the garden module.

32. The floating support assembly as recited in claim 24 where the garden modules have different net buoyancies.

33. The floating support assembly as recited in claim 24 where structural module and plurality of garden modules have spoke shaped orientation.

* * * * *